United States Patent
Joyner et al.

(10) Patent No.: US 6,603,592 B1
(45) Date of Patent: Aug. 5, 2003

(54) OPTICAL WAVELENGTH CONVERTER

(75) Inventors: Charles H. Joyner, Red Bank, NJ (US); Jacco Leonard Pleumeekers, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/669,745

(22) Filed: Sep. 26, 2000

(51) Int. Cl.$^7$ .............................. G02F 1/35; G02F 2/02

(52) U.S. Cl. .................. 359/332; 359/326; 385/42; 385/27

(58) Field of Search .................. 359/326–332; 385/1, 2, 4, 5, 8, 9, 14, 41, 42, 27, 39

(56) References Cited

U.S. PATENT DOCUMENTS

| | | | |
|---|---|---|---|
| 4,822,992 A | 4/1989 | Bar-Joseph et al. | 250/211 |
| 5,333,231 A * | 7/1994 | Fukuda et al. | 359/332 |
| 5,434,700 A | 7/1995 | Yoo | 359/332 |
| 5,559,624 A | 9/1996 | Darcie et al. | 359/125 |
| 5,627,925 A | 5/1997 | Alferness et al. | 385/17 |
| 5,673,140 A | 9/1997 | Fisher | 359/332 |
| 5,739,933 A | 4/1998 | Dembeck et al. | 359/117 |
| 5,739,935 A | 4/1998 | Sabella | 359/128 |
| 5,815,628 A | 9/1998 | Ueno | 385/131 |
| 5,878,177 A | 3/1999 | Karasan et al. | 385/17 |
| 5,949,573 A | 9/1999 | Glance | 359/326 |
| 6,046,841 A | 4/2000 | Mahgerefteh et al. | 359/326 |
| 6,208,454 B1 * | 3/2001 | Koren et al. | 359/124 |
| 6,208,455 B1 * | 3/2001 | Ueno et al. | 359/332 |
| 6,323,992 B1 * | 11/2001 | Ueno | 359/326 |

FOREIGN PATENT DOCUMENTS

| | | |
|---|---|---|
| EP | 0 717 482 A1 | 6/1996 |
| EP | 0 883 017 A2 | 12/1998 |

OTHER PUBLICATIONS

Lacey, J. P. R., "All–Optical 1300–nm to 1550–nm Wavelength Converstion Using Cross–Phase Modulation in a Semiconductor Optical Amplifier," IEEE Photonics Technology Letters, vol. 8, No. 7, pp. 885–887, Jul. 1996.

Barnsley, P.E. et al. "Wavelength Converstion from 1.3 to 1.55 $\mu$m Using Split Contact Optical Amplifiers," IEEE Photonics Technology Letters, vol. 3, No. 3, pp. 256–258, Mar. 1991.

Ma, B. et al: "Realization of All–Optical Wavelength Converter Based on Directionally Coupled Semiconductor Optical Amplifiers," IEEE Photonics Technology Letters, vol. 11, No. 2, pp. 188–190, Feb. 1999.

Ma, B. et al., "Gain Charateristics Of Codirectionally Coupled Semiconductor Optical Amplifier For Polarity–Non–Inverted Digital Wavelenth Conversion", Electronics Letters, $2^{nd}$, vol. 35, No. 18, Sep., 1999.

Saleh, B.E.A. and Teich, M.C., "Fundamentals of Photonics", John Wiley & Sons, Inc., New York, pp. 265–270 and 701–708, 1991.

T. Tamir, "Integrated Optics", Springer–Verlag Berlin, pp. 186–189, 1979.

B. Ma et al, "Realization of All–Optical Wavelength Converter Based on Directionally Coupled Semiconductor Optical Amplifiers", IEEE Photonics Technology Letters, IEEE Inc., New York, vol. 11, No. 2, Feb. 1999, pp. 188–190.

* cited by examiner

*Primary Examiner*—Hemang Sanghavi
*Assistant Examiner*—Scott A Knauss
(74) *Attorney, Agent, or Firm*—Ozer Teitelbaum

(57) ABSTRACT

An optical-to-optical wavelength converter for converting a plurality of optical bits from a first wavelength in a first wavelength band to a second wavelength in a second wavelength band. The optical-to-optical wavelength converter employs a directional coupler. The directional coupler includes at least one optical element having an index of refraction, which changes in response to optical power substantially in the first wavelength band.

20 Claims, 2 Drawing Sheets

OPTICAL WAVELENGTH CONVERTER

FIELD OF THE INVENTION

The present invention relates to optical communication, generally, and more particularly to wavelength converters.

BACKGROUND OF THE INVENTION

Dense wavelength division multiplexing ("DWDM") systems provide numerous wavelength channels for optical communication. DWDM systems employ wavelength converters for rearranging and reallocating wavelength channels in a single optical wavelength band. For the purposes of the present disclosure, the phrase "wavelength band" refers to a distinct portion of the optical spectrum having a wavelength width of approximately 100 nm.

With the growth in network interconnectivity, a new application for wavelength converters has emerged. Wavelength converters are now being used for interfacing short haul communication applications, in the 1300 nm wavelength band, with long haul communication applications, in the 1500 nm wavelength band. To date, wavelength converters for interfacing communication applications have employed an optical-to-electrical-to-optical design. Converting an optical data signal to an electrical data signal and back into an optical data signal, however, has posed limitations on data transmission rates. Presently, optical-to-electrical-to-optical wavelength converters have reached data transmission rates of approximately 620 MB/s.

Given these limitations, considerable research has been expended on developing a wavelength converter having an optical-to-optical design. One such optical-to-optical wavelength converter has been proposed by Barnsley and Fiddyment, in IEEE Photonics Technology Letters, Vol. 3, No. 3, March 1991 (hereinafter "Barnsley"). Barnsley suggests an optical-to-optical wavelength converter for converting an optical data signal from a first wavelength in the 1300 nm wavelength band to a second wavelength in the 1500 nm wavelength band. It is believed, however, that Barnsley's device generates amplified spontaneous emission in the 1500 nm wavelength band. Thus, Barnsley's optical-to-optical converter apparently introduces noise in the same wavelength band as that of the converted optical data signal.

Another optical-to-optical converter has been proposed by Ma et al., in IEEE Photonics Technology Letters, Vol. 11, No. 2, February 1999 (hereinafter "Ma"). Ma suggests an optical-to-optical wavelength converter for converting an optical data signal from a first wavelength in the 1500 nm wavelength band to a second wavelength in the 1500 nm wavelength band. It is believed that Ma's optical-to-optical wavelength converter is intended to support the rearrangement and reallocation of wavelength channels in the 1500 nm wavelength band.

Ma's optical-to-optical wavelength converter appears to comprise a directional coupler having a first waveguide for receiving an optical data signal at a first wavelength in the 1500 nm wavelength band and a second waveguide for receiving a continuous wave optical signal at a second wavelength in the 1500 nm wavelength band. From Ma's disclosure, it is believed that the continuous wave optical signal is coupled from the second waveguide to the first waveguide in response to a binary zero in the original optical data signal, while the continuous wave optical signal continues to propagate through the second waveguide in response to a binary one in the original optical data signal.

Ma's optical-to-optical wavelength converter, however, has several shortcomings. First, it is believed that Ma's optical-to-optical wavelength converter is intended to assist in the management of long haul communication traffic by preventing the collision of two or more incoming optical data signals having the same wavelength in the 1500 nm wavelength band. As such, Ma's device appears limited to converting wavelengths within the same wavelength band. For example, the optical-to-optical wavelength converter of Ma apparently cannot convert optical signals from a first wavelength in the 1300 nm band to a second wavelength in the 1500 nm wavelength band. If the optical bits at the first wavelength in the 1500 nm wavelength band of Ma's proposal are replaced with optical bits at a wavelength in the 1300 nm wavelength band, it is believed that the continuous wave optical signal in the 1500 nm wavelength band would likely continue to couple from the second waveguide to the first waveguide, irrespective of the binary values of the optical data signal in the 1300 nm wavelength band.

Further, the response characteristics, such as the signal to noise ratio, of Ma's optical-to-optical converter are apparently sub-optimal. The device of Ma appears to create amplified spontaneous emission in the 1500 nm wavelength band. As such, it is believed that Ma's optical-to-optical converter introduces noise in the same wavelength band (1500 nm) as that of the converted optical data signal (1500 nm).

It also appears that Ma's device has specific power requirements. Apparently, Ma's continuous wave optical signal must be lower in power than the original optical data signal for proper operation. If the continuous wave optical signal is relatively close in power to the original optical data signal, it is believed that that the continuous wave optical signal would likely continue to couple from the second waveguide to the first waveguide, irrespective of the binary values of the original optical data signal.

Consequently, a need exists for an optical-to-optical wavelength converter for converting an optical data signal from a first wavelength in the 1300 nm band to a second wavelength in the 1500 nm wavelength band having a data transmission rate greater than 620 MB/s. There is also a need for an optical-to-optical wavelength converter, which does not introduce noise, such as amplified spontaneous emission, in the wavelength band of the converted optical data signal. A need also exists for an optical-to-optical wavelength converter employing a continuous wave optical signal, which need not be lower in power than the original optical data signal.

SUMMARY OF THE INVENTION

We have invented an optical-to-optical wavelength converter for converting a plurality of optical bits from a first wavelength in a first wavelength band to a second wavelength in a second wavelength band. For the purposes of the present disclosure, the phrase "plurality of optical bits" refers to a digital data stream optically encoded using a modulation scheme, such as amplitude shift key modulation, for example.

In contrast with known prior art, our optical-to-optical wavelength converter does not introduce amplified spontaneous emission noise in the wavelength band of the converted plurality of optical bits. Further, the continuous wave optical signal, as employed with our invention, need not be lower in power than the plurality of optical bits to be converted, unlike the known prior art. Our optical-to-optical wavelength converter also supports a data transmission rate substantially greater than 620 MB/s.

In an illustrative embodiment of the present invention, an optical-to-optical wavelength converter comprises a directional coupler. The directional coupler comprises at least one optical element, such as, for example a semiconductor optical amplifier. The optical element has an index of refraction, which changes in response to optical power substantially in the first wavelength band.

These and other embodiments, advantages and objects will become apparent to skilled artisans from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

DETAILED DESCRIPTION OF THE PRESENT INVENTION

The optical-to-optical wavelength converter of the illustrative embodiment converts a plurality of optical bits at a first wavelength in the 1300 nm wavelength band to a second wavelength at least in the 1500 nm wavelength band. However, it should be apparent to skilled artisans that alternative wavelength bands may also be employed using the present invention, and as such, are contemplated by the instant disclosure.

Figure 1:
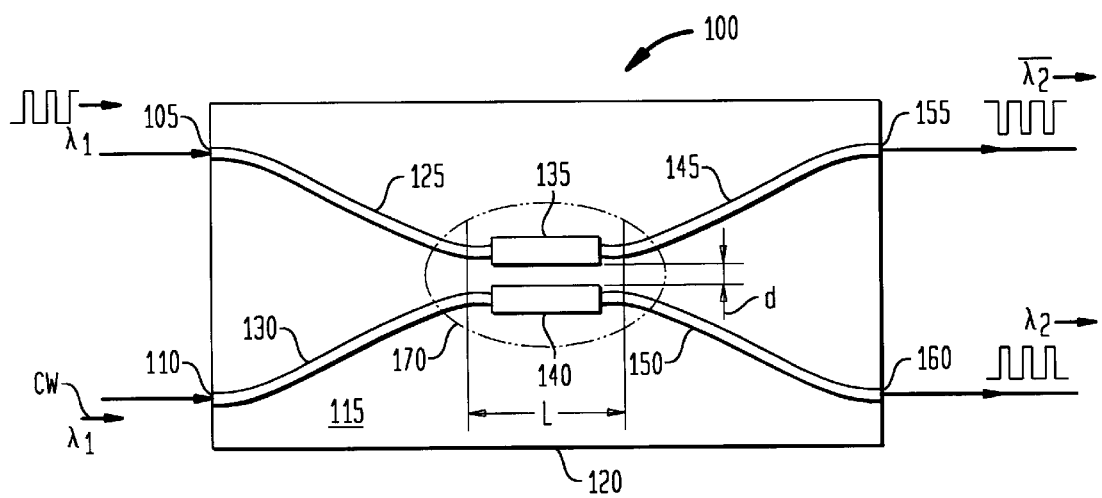
FIG. 1 illustrates a first embodiment of the present invention.

Referring to FIG. 1, an optical-to-optical wavelength converter 100 is illustrated according to a first embodiment of the present invention. Optical-to-optical wavelength converter 100 comprises a directional coupler 120. Directional coupler 120 includes a first input waveguide 125 for receiving a plurality of optical bits from a first input port 105. Each optical bit of the plurality has a substantially similar wavelength in a first wavelength band (i.e., 1300 nm band). Directional coupler 120 also includes a second input waveguide, 130, for receiving a continuous wave optical signal at a second wavelength in a second wavelength band (i.e., 1500 nm band) from a second input port 110. Thus, for example, each optical bit of the plurality has a first wavelength, $\lambda_1$, of approximately 1310 nm, while the continuous wave optical signal has a second wavelength, $\lambda_2$, of approximately 1550 nm.

Coupled to first input waveguide 125 are a first optical element 135 and a first output waveguide 145. A refractive index, $n_1$, of first optical element 135 changes in response to receiving optical power in the first wavelength band. Second waveguide 130 is coupled to a second optical element 140 and a second output waveguide 150. Second optical element 140 has a refractive index, $n_2$, which does not change in response to receiving optical power in the second wavelength band. Optical elements 135 and 140 may be realized by various suitable components known to skilled artisans to achieve the described function, such as, for example, a pair of semiconductor optical amplifiers.

It should be noted that waveguides, 125, 130, 145 and 150, are described in the present disclosure as individual waveguides. However, first input and output waveguides, 125 and 145, may be manufactured as a single waveguide. Similarly, second input and output waveguides, 130 and 150, may be manufactured as a single waveguide. In one embodiment, directional coupler 120, waveguides 125, 130, 145 and 150, as well as optical elements, 135 and 140, form an integrated-optical component on a single substrate 115.

Operationally, directional coupler 120 directs the continuous wave optical signal to first or second output waveguides, 145 or 150, in response to the value of each optical bit of the plurality at the first wavelength. By this arrangement, an output signal propagates through second output waveguide 150 at the wavelength of the continuous wave optical signal. The bit values of output signal correspond with the bit values of the original plurality of optical bits at the first wavelength. Similarly, a complementary output signal propagates through first output waveguide 145 at the wavelength of the continuous wave optical signal. The bit values of the complementary output signal correspond with the complement of the bit values of the original plurality of optical bits at the first wavelength.

More specifically, if a bit of the plurality of optical bits is equal to a first value, such as a binary zero, for example, directional coupler 120 is balanced. When the directional coupler 120 is balanced, the refractive indexes, $n_1$ and $n_2$, are substantially equivalent. In a balanced state, directional coupler 120 enables the continuous wave optical signal to couple from second input waveguide 130 to first output waveguide 145 by way of a coupling effect, as will be described in detail hereinbelow.

If, on the other hand, a bit of the plurality of optical bits is equal to a second value, such as a binary one, for example, directional coupler 120 is unbalanced. Here, the refractive index, $n_1$, of first optical element 135 has changed relative to the refractive index, $n_2$, in response to optical power in the first wavelength band. Consequently, directional coupler 120 is switched into an unbalanced state as refractive indexes, $n_1$ and $n_2$, are no longer equal to each other. Once unbalanced, the coupling effect is substantially minimized and directional coupler 120 enables the continuous wave optical signal to propagate from second input waveguide 130 to second output waveguide 150.

As noted above, directional coupler 120 relies on the coupling effect to effectuate wavelength conversion of the original plurality of optical bits. The coupling effect is a known phenomenon wherein two waveguides are positioned in sufficiently close proximity to one another such that their fields may overlap, enabling an optical signal to couple from one waveguide to the other waveguide. Directional couplers for promoting the coupling effect are known and commercially available. For more information on directional couplers, generally, and the coupling effect, more specifically, see Saleh and Teich, "The Fundamentals of Photonics," Wiley and Sons 1991, and Tamir, "Integrated Optics," ($2^{nd}$ Edition) Springer-Verlag 1979.

To realize the coupling effect, directional coupler 120 has a coupling region 170. Coupling region 170 comprises first and second optical elements, 135 and 140, as well as end portions of waveguides 125, 130, 145 and 150. Coupling region 170 is designed to facilitate the coupling effect in response to certain bit values of incoming plurality of optical bits from input waveguide 125. For example, if a bit value of the plurality within the first wavelength band is a binary zero, the refractive indexes, $n_1$ and $n_2$, of first and second optical elements, 135 and 140, are substantially equal to one another. Given these conditions and the particular design of the coupling region, as will be detailed hereinbelow, the coupling effect causes the continuous wave optical signal to propagate from second input waveguide 130 to first output waveguide 145.

The effective transfer of the continuous wave optical signal from second input waveguide 130 to first output waveguide 145 is a function of the design parameters of coupling region 170. Coupling region 170 has a gap, d, defined as the proximate distance separating the pair of waveguides to enable their potential fields to overlap. Moreover, coupling region 170 has a length, L, defined as the distance in which the pair of waveguides is spaced by the gap, d. The gap, d, and length, L, are selected to enable a particular result—namely, the coupling of an optical signal within a particular wavelength band from one waveguide to the other waveguide. It should be noted that the coupling effect might also cause optical signals outside the desired wavelength band to transfer between waveguides. Consequently, gap, d, and length, L, are selected to optimally couple optical power in the 1500 nm wavelength band between the pair of waveguides, while substantially minimizing the effective transfer of optical signals outside the desired wavelength band.

By the configuration of directional coupler 120, a plurality of optical bits in the wavelength band of the continuous wave optical signal propagates through an output port 160 by means of coupling region 170. The plurality of optical bits at output port 160 correspond with the bit values of the plurality of optical bits received by input port 105. Similarly, a plurality of optical bits in the wavelength band of the continuous wave optical signal propagates through a complementary output port 155 by means of coupling region 170. The plurality of optical bits at complementary output port 155, however, corresponds with the complement of the bit values of the plurality of optical bits received by input port 105.

Given manufacturing tolerances, it should be noted that the coupling effect may also cause a small percentage of the optical power from the plurality of optical bits within the first wavelength band to couple from first input waveguide 125 to second output waveguide 150. To filter this first wavelength optical power from the plurality of optical bits in the second wavelength band, an output semiconductor optical amplifier (not shown) may also be coupled between second output waveguide 150 and output port 160, and advantageously formed on substrate 115. The output semiconductor optical amplifier is designed to absorb and, therefore, attenuate light within the first wavelength band. This output semiconductor optical amplifier may also be designed to amplify optical power in the second wavelength to increase the signal power of the plurality of optical bits propagating through output port 160 within the second wavelength band.

In another embodiment, an input pre-amplifier may also be incorporated between input port 105 and input waveguide 125. The input pre-amplifier amplifies the plurality of optical bits in the first wavelength band before reaching coupling region 170. In one embodiment, the input pre-amplifier may be realized by a semiconductor optical amplifier. By incorporating the pre-amplifier, the negative impact of scattered stray light and other noise created in coupling the plurality of optical bits in the first wavelength band into port 105 may be substantially reduced. As such, a low power optical signal having a wavelength in the first wavelength band may still be converted using the present invention. In one embodiment, a binary one having a wavelength in the first wavelength band has an optical power of less than 2 mW.

Figure 2:
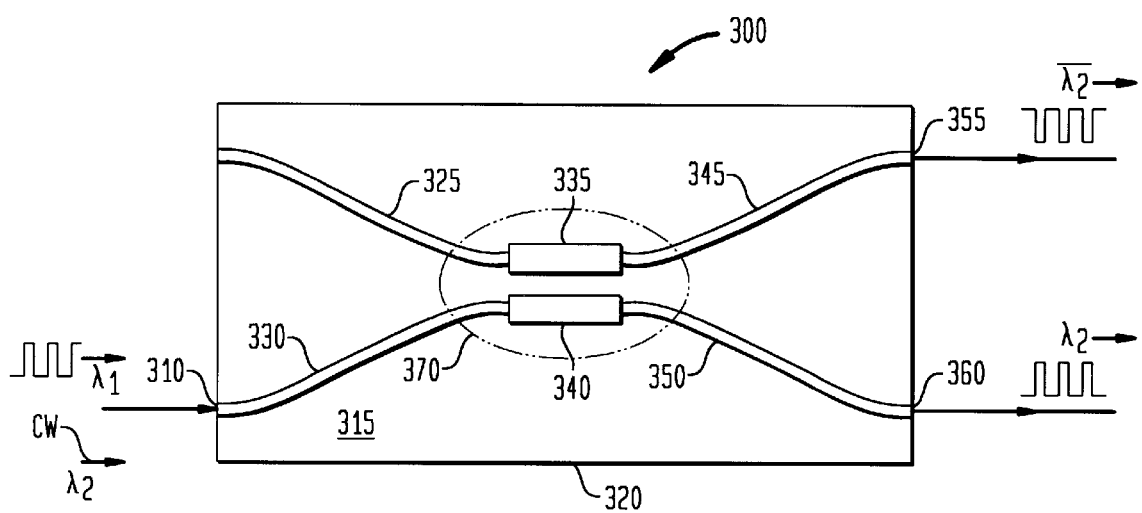
FIG. 2 illustrates a second embodiment of the present invention.

Referring to FIG. 2, an optical-to-optical wavelength converter 300 is illustrated according to a second embodiment of the present invention. Optical-to-optical wavelength converter 300 operates much like converter 100 of FIG. 1. However, converter 300 employs one input port 310 for receiving both a plurality of optical bits at a first wavelength in a first wavelength band and a continuous wave optical signal operating at a second wavelength in a second wavelength band. As with converter 100 of FIG. 1, converter 300 generates a wavelength converted output signal at a first output port 360, and a wavelength converted complementary output signal at a second output port 355. By receiving the plurality of optical bits and the continuous wave optical signal through one input port 310, the packaging of converter 300 may be simplified.

Optical-to-optical wavelength converter 300 is designed similarly to converter 100 of FIG. 1. Converter 300 comprises a directional coupler 320 having an input waveguide 330 for receiving the plurality of optical bits and the continuous wave optical signal from input port 310. Coupled with input waveguide 330 are a first optical element 340 and a first output waveguide 350. First optical element 340 has a refractive index, $n_1$, which changes in response to receiving optical power within the first wavelength band. Directional coupler 320 also comprises a second optical element 335. Second optical element 335 has a refractive index, $n_2$, which does not change in the presence of optical power in the second wavelength band. Coupled with second optical element 335 are a second output waveguide 345 and a second output port 355.

Directional coupler 320 directs the continuous wave optical signal between first and second output waveguides, 350 and 345, in response to the bit values of the plurality of optical bits. By this arrangement, a plurality of optical bits, at the wavelength of the continuous wave optical signal and corresponding with the bit values of the plurality of optical bits, propagates through first output waveguide 350. Similarly, the compliment of the plurality of optical bits at the wavelength of the continuous wave optical signal propagates through second output waveguide 345.

Directional coupler 320 comprises a coupling region 370. Coupling region 370 facilitates the coupling effect in response to the bit values of the incoming plurality of optical bits from input waveguide 330. Coupling region 370 comprises optical elements, 335 and 340, and the end portions of waveguides 325, 330, 345 and 350.

Operationally, if a bit of the plurality within the first wavelength band is equal to a first value, such as a binary zero, for example, refractive indexes, $n_1$ and $n_2$, of semiconductor optical amplifier 340 and optical element 335 are designed to be substantially equal to each other. Consequently, the coupling effect causes the continuous wave optical signal to propagate from first input waveguide 330 to second output waveguide 345. On the other hand, if a bit of the plurality within the first wavelength band is equal to a second value, such as a binary one, for example, the refractive index, $n_1$, of first optical element 340 changes relative to the refractive index, $n_2$, of second optical element 335. Consequently, refractive indexes, $n_1$ and $n_2$, are no longer equal to one another, causing the continuous wave optical signal to propagate from first input waveguide 330 to first output waveguide 350.

It should be noted that optical-to-optical wavelength converters 100 and 300 might also simultaneously convert a plurality of optical bits having a first wavelength in a first wavelength band to a number of differing pluralities of optical bits. Here, a number of continuous wave optical signals, each having a different wavelength, are fed into an input port of the directional coupler. The directional coupler directs each continuous wave optical signal between an output port and a complementary output port in response to the bit values of the original plurality of optical bits, as detailed hereinabove. Consequently, the output port presents a multitude of pluralities of optical bits. Each plurality of optical bits at the output port corresponds with the wavelength of one of the number of continuous wave optical signals, as well as the bit values of the original plurality of optical bits.

The directional coupler of the present invention may be fabricated using InP based semiconductor processing techniques. These fabrication steps include growing semiconductor layers over an InP substrate. The grown semiconductor layers are patterned, etched and regrown. Metals are thereafter deposited to form contacts. In one embodiment of the present invention, the directional coupler has a pair of active waveguide layers formed above the InP based substrate. The active waveguide layers comprise GaInAsP. Each GaInAsP layer is surrounded by a cladding layer of InP. It should be noted that the materials, dimensions and parameters disclosed herein are merely exemplary in nature, and may be modified in view of the herein disclosure to achieve the benefits of the present invention.

In an exemplary embodiment of the present invention, the directional coupler is 3 mm long. Each active waveguide layer has a width of 1.0 $\mu$m, and a thickness 0.2 $\mu$m. Moreover, the directional coupler has a coupling region wherein both active waveguide layers control the direction of the continuous wave optical signal. The coupling region has a gap, d, of 2.0 $\mu$m between both active waveguide layers and a length, L, of 600 $\mu$m, to effectuate a coupling effect between waveguides within the coupling region. The cladding portion, InP, of each waveguide has a refractive index of is 3.166 in the presence of 1550 nm wavelength light, and 3.203 in the presence of 1310 nm wavelength light. Likewise, the refractive index of active portion, GaInAsP, of each waveguide layer is 3.43 in the presence of 1550 nm wavelength light, and 3.53 in the presence of 1310 nm wavelength light.

The active regions of either waveguide should provide negligible loss to the continuous wave optical signal at 1550 nm. However, coupling losses in coupling the continuous wave optical signal into the directional coupler, as well as scattering losses attributable to shape of the waveguides of the directional coupler are estimated to be in the approximate range of 10 to 16 decibels ("dB"). Given these losses, the input power of the continuous wave optical signal may be selected in the approximate range of 1 mW to 10 mW.

In contrast, the optical power associated with the input data stream at 1310 nm must initiate the switching behavior detailed herein. The power required to effectuate this switching is dependent on several parameters including the coupling loss in coupling the data signal into the directional coupler, polarization loss, coupling constant within the directional coupler, as well as heat dissipation. In the present configuration, estimated operable parameters for determining the power of the input data stream include a coupling loss of less than −6 dB, a polarization dependent loss of −2 dB, and heat dissipation in the range of 0.3 W to 1.5 W. Typically, the input data stream will switch between 0 mW for a binary zero, and 10 mW for a binary one.

Given the above estimated operable parameters, it is assumed that the ratio of the power of a binary one and a binary zero—also referred to as extinction ratio—will be approximately 100. To maximize the extinction ratio, each of the fabricated semiconductor optical amplifiers operates are forward biased by a current source to operate within their saturation region. In one embodiment, a bias current of 100 mA, and bias voltage of 1.5V are used for both semiconductor optical amplifiers. By this arrangement, it is estimated that the present invention will yield an extinction ratio of approximately 20 decibels at a data transmission rate of 10 GB/s.

While our invention has been described with reference to illustrative embodiments, this description is not meant to be construed in a limiting sense. It is understood by skilled artisans that various modifications of the illustrative embodiments, as well as additional embodiments of the invention, will be apparent to skilled artisans upon reference to this description without departing from the spirit of the invention, as recited in the claims appended hereto. Thus, it will be apparent to skilled artisans that the directional coupler may be alternatively designed to switch from an unbalanced state to a balanced state upon receiving optical power in the first wavelength band. It is therefore contemplated that the appended claims will cover any such modifications or embodiments as fall within the true scope of the invention.

What is claimed is:

1. An optical-to-optical wavelength converter comprising:
a directional coupler adapted to convert a plurality of optical bits at a first wavelength to a second wavelength, characterized in that the first wavelength is in a 1300 nm band and the second wavelength is in a 1500 nm band, the directional coupler comprising at least one optical element having an index of refraction which changes in response to optical power in the 1300 nm band, and a coupling region selected to optimally couple power in the 1500 nm band while substantially minimizing the effective transfer of optical signals outside the 1500 nm band.

2. The optical-to-optical wavelength converter of claim 1, wherein the directional coupler propagates at least one continuous wave signal (CW) in the 1500 nm band through an output port if a bit of the plurality is equal to a first value.

3. The optical-to-optical wavelength converter of claim 2, wherein the at least one optical element comprises at least one semiconductor optical amplifier for directing the continuous wave signal to the output port if a bit of the plurality of optical bits is equal to the first value, and the at least one semiconductor optical amplifier directs the continuous wave signal to a complementary output port if the bit is equal to a second value.

4. The optical-to-optical wavelength converter of claim 3, wherein the directional coupler comprises:
at least one waveguide for receiving the plurality of optical bits in the first wavelength band and the continuous wave signal in the second wavelength band; and
a coupling region for coupling the continuous wave signal from the at least one waveguide to the output port if the bit of the plurality is equal to the first value, and for coupling the continuous wave signal from the at least one waveguide to the complementary output port if the bit of the plurality is equal to the second value, such that optical power propagating in the second wavelength through the output port corresponds with the bit values of the plurality of optical bits in the first wavelength band.

5. The optical-to-optical wavelength converter of claim 4, further comprising:
a first waveguide for receiving the plurality of optical bits in the first wavelength band; and
a second waveguide for receiving the continuous wave signal in the second wavelength band.

6. The optical-to-optical wavelength converter of claim 4, further comprising an output semiconductor optical amplifier for attenuating the plurality of optical bits in the first wavelength band propagating through the output port.

7. The optical-to-optical wavelength converter of claim 1, wherein the directional coupler comprises a pair of semiconductor optical amplifiers having refractive indices, $n_1$ and $n_2$, respectively, $n_1$ changing in response to receiving optical power within the 1300 nm band and $n_2$ substantially equal to $n_1$ in the absence of optical power within the 1300 nm band.

8. An optical-to-optical wavelength converter comprising:
 a directional coupler adapted to convert a plurality of optical bits at a first wavelength to a second wavelength, characterized in that the first wavelength is in a 1300 nm band and the second wavelength is in a 1500 nm band;
 wherein the directional coupler comprises
  at least one optical element having an index of refraction responsive to optical power in the first wavelength and propagates at least one continuous wave signal in the second wavelength band through an output port if a bit of the plurality is equal to a first value,
 wherein the at least one optical element comprises
  at least one semiconductor optical amplifier for directing the continuous wave signal to the output port if a bit of the plurality of optical bits is equal to the first value, and the at least one semiconductor optical amplifier directs the continuous wave signal to a complementary output port if the bit is equal to a second value,
 wherein the directional coupler further comprises
  at least one waveguide for receiving the plurality of optical bits in the first wavelength band and the continuous wave signal in the second wavelength band; and
  a coupling region for coupling the continuous wave signal from the at least one waveguide to the output port if the bit of the plurality is equal to the first value, and for coupling the continuous wave signal from the at least one waveguide to the complementary output port if the bit of the plurality is equal to the second value, such that optical power propagating in the second wavelength through the output port corresponds with the bit values of the plurality of optical bits in the first wavelength band,
 wherein the directional coupler is balanced if the bit of the plurality is a binary one such that the continuous wave signal couples to the complementary output port, and the directional coupler is unbalanced if the bit of the plurality is a binary zero such that the continuous wave signal propagates to the output port.

9. The optical-to-optical wavelength converter of claim 8, wherein the directional coupler is unbalanced by a change in the refractive index.

10. An optical-to-optical wavelength converter comprising:
 a directional coupler adapted to convert a plurality of optical bits at a first wavelength to a second wavelength, characterized in that the first wavelength is in a 1300 nm band and the second wavelength is in a 1500 nm band;
 wherein the directional coupler comprises
  at least one optical element having an index of refraction responsive to optical power in the first wavelength and propagates at least one continuous wave signal in the second wavelength band through an output port if a bit of the plurality is equal to a first value,
 wherein the at least one optical element comprises
  at least one semiconductor optical amplifier for directing the continuous wave signal to the output port if a bit of the plurality of optical bits is equal to the first value, and the at least one semiconductor optical amplifier directs the continuous wave signal to a complementary output port if the bit is equal to a second value,
 wherein the directional coupler further comprises
  at least one waveguide for receiving the plurality of optical bits in the first wavelength band and the continuous wave signal in the second wavelength band; and
  a coupling region for coupling the continuous wave signal from the at least one waveguide to the output port if the bit of the plurality is equal to the first value, and for coupling the continuous wave signal from the at least one waveguide to the complementary output port if the bit of the plurality is equal to the second value, such that optical power propagating in the second wavelength through the output port corresponds with the bit values of the plurality of optical bits in the first wavelength band,
 a combiner for combining the plurality of optical bits in the 1300 nm band with the continuous wave signal, the combiner being coupled with the at least one waveguide.

11. An optical-to-optical wavelength converter comprising:
 a directional coupler for converting a plurality of optical bits from a first wavelength to a second wavelength, the first wavelength in a 1300 nm band and the second wavelength in a 1500 nm band, the directional coupler supporting the propagation of at least one continuous wave signal in the 1500 nm band through an output port if a bit of the plurality is a first value, the directional coupler comprising:
  at least one optical element having an index of refraction responsive to optical power in the first wavelength band, the at least one optical element comprises at least one semiconductor optical amplifier coupled with at least one waveguide; and
  a coupling region for coupling the continuous wave signal through an output port if a bit of the plurality is a binary one, such that a plurality of optical bits in the second wavelength band corresponding with the binary values of the plurality of data bits in the first wavelength band propagate through the output port and wherein the coupling region substantially minimizes the effective transfer of signals outside the 1500 nm band.

12. The optical-to-optical wavelength converter of claim 11, wherein the coupling region has a length and a gap to enable the continuous wave signal to couple from a first waveguide to a complementary output port; and
 the directional coupler balanced if the bit of the plurality is a binary zero and the directional coupler unbalanced if the bit of the plurality is a binary one to change the refractive index of the at least one semiconductor optical amplifier and enable the continuous wave signal to propagate through the output port.

13. The optical-to-optical wavelength converter of claim 12, wherein the directional coupler, at least one waveguide, output port and complementary output port are formed on a single substrate.

14. The optical-to-optical wavelength converter of claim 12, further comprising an input semiconductor optical amplifier for amplifying optical power in the first wavelength.

15. The optical-to-optical wavelength converter of claim 12, further comprising an output semiconductor optical amplifier for attenuating optical power in the first wavelength band.

16. An optical-to-optical wavelength converter for converting plurality of optical bits from a first wavelength in a 1300 nm band to a second wavelength in a 1500 nm band, the optical-to-optical wavelength converter receiving at least one continuous wave signal, the optical-to-optical wavelength converter comprising:

a first waveguide for receiving the plurality of optical bits in the 1300 nm band, the first waveguide comprising a first semiconductor optical amplifier having a refractive index responsive to optical power in the 1300 nm band;

a second waveguide for receiving the continuous wave signal, the second waveguide comprising a second semiconductor optical amplifier; and a coupling region for coupling the continuous wave signal through an output port if a bit of the plurality is a binary one, and for coupling the continuous wave signal through a complementary output port if a bit of the plurality is a binary zero, such that a plurality of optical bits in the 1500 nm band corresponding with the binary values of the plurality of data bits in the 1300 nm band propagate through the output port, wherein:

the coupling region has a length and gap to enable the continuous wave signal to couple from the second waveguide to the complementary output port, and wherein the coupling region substantially minimizes the effective transfer of signals outside the 1500 nm band; and the directional coupler balanced if the bit of the plurality is a binary zero, and unbalanced if the bit of the plurality is a binary one to change the refractive index of at least one of the semiconductor optical amplifiers and enable the continuous wave signal in the second wavelength band to propagate through the output port.

17. The optical-to-optical wavelength converter of claim 16, further comprising an input semiconductor optical amplifier for amplifying optical power in the first wavelength band.

18. The optical-to-optical wavelength converter of claim 16, further comprising an output semiconductor optical amplifier for attenuating optical power in the first wavelength band.

19. The optical-to-optical wavelength converter of claim 16, further comprising a complementary output semiconductor optical amplifier for attenuating optical power in the first wavelength band.

20. A method for converting a plurality of optical bits from a first wavelength in a 1300 nm band to a second wavelength in a 1500 nm band, the method comprising:

changing a refractive index of an optical element responsive to optical power in the 1300 nm band;

coupling a continuous wave signal at the second wavelength from an input to an output in response to a bit of the plurality being a first value;

minimizing the effective transfer of signals outside the 1500 nm band; and coupling the continuous wave signal from the input to a complementary output if a bit of the plurality is a second bit value.

* * * * *